United States Patent
Vaal (10) Patent No.: US 10,500,788 B2
(45) Date of Patent: Dec. 10, 2019

(54) APPARATUS AND METHODS FOR ADDITIVE MANUFACTURING AT AMBIENT TEMPERATURE

(71) Applicant: Thermwood Corporation, Dale, IN (US)

(72) Inventor: Scott G. Vaal, Jasper, IN (US)

(73) Assignee: Thermwood Corporation, Dale, IN (US)

(*) Notice: Subject to any disclaimer, the term of this patent is extended or adjusted under 35 U.S.C. 154(b) by 0 days.

(21) Appl. No.: 15/805,451

(22) Filed: Nov. 7, 2017

(65) Prior Publication Data

US 2019/0134900 A1    May 9, 2019

(51) Int. Cl.
  *B29C 64/205*  (2017.01)
  *B29C 64/106*  (2017.01)
  (Continued)

(52) U.S. Cl.
  CPC .......... *B29C 64/205* (2017.08); *B29C 64/106* (2017.08); *B29C 64/209* (2017.08);
  (Continued)

(58) Field of Classification Search
  CPC ... B29C 64/106; B29C 64/241; B29C 64/295; B29C 2947/92104
  See application file for complete search history.

(56) References Cited

U.S. PATENT DOCUMENTS 5,303,141 A * 4/1994 Batchelder ............. B29C 41/36
  156/244.11
5,312,224 A * 5/1994 Batchelder ............. B29C 47/38
  29/888.02

(Continued)

FOREIGN PATENT DOCUMENTS

CN    104149352 B    11/2014
EP    3002108 A1    4/2016
(Continued)

OTHER PUBLICATIONS

"Reiloy Westland Corporation." L/D Ratio » Reiloy Westland Corporation, WayBack Machine Generate NPL, Jun. 21, 2013, reiloyusa.com/processing-tips/screw-design/Id-ratio/. (Year: 2013).*

(Continued)

*Primary Examiner* — Seyed Masoud Malekzadeh
*Assistant Examiner* — Taryn Trace Willett
(74) *Attorney, Agent, or Firm* — Bookoff McAndrews, PLLC (57) ABSTRACT

An exemplary additive manufacturing system may include an extruder having an opening dimensioned to receive a material. The extruder also may have a barrel and a screw within the barrel. The screw may have a diameter ranging between about 20 mm and about 150 mm and the barrel extends along a longitudinal axis. The system may include one or more heaters positioned along at least a portion of the barrel. As the material passes through the barrel, the one or more heaters may at least partially melt the material. The system may further include a gear pump in fluid communication with the barrel for receiving the at least partially melted material. Additionally, the system may include a nozzle in fluid communication with the gear pump for depositing the at least partially melted material. The system also may include a vertical worktable.

22 Claims, 6 Drawing Sheets

(51) Int. Cl.
*B29C 64/393* (2017.01)
*B29C 64/241* (2017.01)
*B29C 64/209* (2017.01)
*B29C 64/30* (2017.01)

(52) U.S. Cl.
CPC ............ *B29C 64/241* (2017.08); *B29C 64/30* (2017.08); *B29C 64/393* (2017.08)

(56) References Cited

U.S. PATENT DOCUMENTS

| | | | | |
|---|---|---|---|---|
| 5,764,521 | A * | 6/1998 | Batchelder | B29C 41/36 156/244.21 |
| 6,593,053 | B1 * | 7/2003 | Chang | B29C 47/1063 430/137.18 |
| 7,731,816 | B2 | 6/2010 | Oldani et al. | |
| 7,810,539 | B2 | 10/2010 | Mischler et al. | |
| 7,891,964 | B2 * | 2/2011 | Skubic | B29C 64/106 264/113 |
| 8,151,854 | B2 | 4/2012 | Oldani | |
| 8,534,338 | B2 | 9/2013 | Oldani et al. | |
| 8,954,180 | B2 | 2/2015 | Oldani | |
| 9,102,098 | B2 * | 8/2015 | Dilworth | B29C 47/0002 |
| 9,701,065 | B2 * | 7/2017 | Hang | B29C 67/007 |
| 9,796,140 | B2 * | 10/2017 | Page | B29C 64/106 |
| 2004/0121132 | A1 * | 6/2004 | Slyne | B29C 47/0035 428/195.1 |
| 2007/0044899 | A1 | 3/2007 | Tingley | |
| 2008/0006017 | A1 | 1/2008 | Rindels | |
| 2008/0213419 | A1 * | 9/2008 | Skubic | B29C 47/0806 425/113 |
| 2010/0200168 | A1 | 8/2010 | Oldani et al. | |
| 2012/0279441 | A1 * | 11/2012 | Creehan | B23K 20/122 118/76 |
| 2014/0048980 | A1 * | 2/2014 | Crump | B29C 64/106 264/401 |
| 2014/0048981 | A1 * | 2/2014 | Crump | B33Y 30/00 264/401 |
| 2015/0147421 | A1 * | 5/2015 | Te | B29C 67/0055 425/78 |
| 2016/0046073 | A1 * | 2/2016 | Hadas | B29C 67/0085 264/211.21 |
| 2016/0096321 | A1 * | 4/2016 | Fry | B29C 67/0055 425/375 |
| 2016/0200024 | A1 * | 7/2016 | Kim | B29C 47/0803 425/143 |
| 2017/0008230 | A1 * | 1/2017 | Yuyama | B29C 67/0055 |
| 2017/0050268 | A1 * | 2/2017 | Fujiya | B33Y 30/00 |
| 2017/0095976 | A1 * | 4/2017 | Pedersen | B33Y 30/00 |
| 2017/0173891 | A1 * | 6/2017 | Bosveld | B29C 64/106 |
| 2017/0320267 | A1 * | 11/2017 | Lind | B29C 47/0033 |
| 2018/0009160 | A1 * | 1/2018 | Sawada | B29C 64/106 |
| 2018/0050502 | A1 | 2/2018 | Oldani et al. | |
| 2018/0290398 | A1 * | 10/2018 | Mannella | B29C 67/0088 |

FOREIGN PATENT DOCUMENTS

| | | | |
|---|---|---|---|
| EP | 3112133 A1 | 1/2017 | |
| WO | WO-2015129733 A1 * | 9/2015 | ......... B29C 67/0055 |
| WO | WO-2016125860 A1 * | 8/2016 | ............ B29C 67/00 |

OTHER PUBLICATIONS

Additive Manufacturing 2 Technology Assessment. (Dec. 18, 2016). Retrieved from https://www.energy.gov/sites/prod/files/2015/02/f19/ QTR Ch8 - Additive Manufacturing TA Feb-13-2015_0.pdf (Year: 2016).*
International Search Report and Written Opinion for International Application No. PCT/US2018/041236, dated Nov. 2, 2018 (11 pages).

* cited by examiner

APPARATUS AND METHODS FOR ADDITIVE MANUFACTURING AT AMBIENT TEMPERATURE

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material and applying this material in layers to produce a final part. This is commonly accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material may be applied to the existing structure in layers, melting and fusing with the existing material to produce a solid finished part.

The filament used in the aforementioned process may be produced, for example, by using a plastic extruder. This plastic extruder may be comprised of a steel screw configured to rotate inside of a heated steel barrel. Thermoplastic material in the form of small pellets may be introduced into one end of the rotating screw. Friction from the rotating screw, combined with heat from the barrel, may soften the plastic, which may then be forced under pressure through a small round opening in a die that is attached to the front of the extruder barrel. In doing so, a string of material may be extruded, after which the extruded string of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x-, y-, and z-axes. In some cases, the flowable material, such as, e.g., molten thermoplastic material, may be infused with a reinforcing material (e.g., strands of fiber or combination of materials) to enhance the material's strength.

The flowable material, while generally hot and pliable, may be deposited upon a substrate (e.g., a mold), pressed down, or otherwise flattened to some extent, and leveled to a consistent thickness, preferably by means of a tangentially compensated roller mechanism. The compression roller may be mounted in or on a rotatable carriage, which may be operable to maintain the roller in an orientation tangential, e.g., perpendicular, to the deposited material (e.g., bead or beads). In some embodiments, the compression roller may be smooth and/or solid. The flattening process may aid in fusing a new layer of the flowable material to the previously deposited layer of the flowable material. The deposition process may be repeated so that successive layers of flowable material are deposited upon an existing layer to build up and manufacture a desired component structure. In some instances, an oscillating plate may be used to flatten the bead of flowable material to a desired thickness; thus, effecting fusion to the previously deposited layer of flowable material. The deposition process may be repeated so that successive layers of flowable material are deposited upon an existing layer to build up and manufacture a desired component structure. When executed properly, the new layer of flowable material may be deposited at a temperature sufficient to allow the new layer of such material to melt and fuse with a previously deposited layer in order to produce a solid part.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to a final size may be compensated for by the faster printing process.

In the practice of the aforementioned process, some disadvantages have been encountered. Generally, parts, even relatively large parts, have been printed using relatively small print beads. Because these beads tend to cool quickly, parts are normally printed onto a heated table, and, if a large part is being formed, often the printing process is conducted in a heated environment. This heated environment may slow the rate of cooling of the part as it is being formed via additive manufacturing, keeping newly deposited layers within the desired temperature range for a longer period of time. This longer period of time allows the system to print longer bead lengths for each printed layer without the material cooling below the minimum temperature required to achieve proper layer-to-layer bonding.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

An exemplary additive manufacturing system may include an extruder having an opening dimensioned to receive a material. The extruder also may have a barrel and a screw within the barrel. The screw may have a diameter ranging between about 20 mm and about 150 mm and the barrel extends along a longitudinal axis. The system may include one or more heaters positioned along at least a portion of the barrel. As the material passes through the barrel, the one or more heaters may at least partially melt the material. The system may further include a gear pump in fluid communication with the barrel for receiving the at least partially melted material. Additionally, the system may include a nozzle in fluid communication with the gear pump for depositing the at least partially melted material. The system also may include a vertical worktable.

In a further example, an exemplary additive manufacturing system may include an extruder having an opening dimensioned to receive a material. The extruder also may have a barrel and a screw positioned within the barrel. The barrel may extend along a longitudinal axis. The system may include one or more heaters positioned along at least a portion of the barrel. As the material passes through the barrel, the one or more heaters may at least partially melt the material. The system may include a gear pump in fluid communication with the barrel for receiving the at least partially melted material. Further, a nozzle may be in fluid communication with the gear pump for depositing the at least partially melted material. The nozzle may have a diameter ranging between about 0.2 inches to about 1.0 inches. Further, the system may include a vertical worktable.

In a further example, an exemplary additive manufacturing system may include an extruder having an opening dimensioned to receive a material. The extruder also may have a barrel extending along a longitudinal axis and a screw. The extruder may have a throughput rate ranging from about 100 pounds of material per hour to about 500 pounds of material per hour. One or more heaters may be positioned along at least a portion of the barrel. As the material passes through the barrel, the one or more heaters may at least partially melt the material. The system may include a gear pump in fluid communication with the barrel for receiving the at least partially melted material. Additionally, a nozzle may be in fluid communication with the gear pump for depositing the at least partially melted material. Further the system may include a vertical worktable.

Exemplary embodiments of the present disclosure may be drawn to a process of forming large structures via additive manufacturing at room temperature, e.g., ambient temperature, or cooler. Embodiments of the disclosure may focus on a process of controlled cooling of the deposited materials, rather than a process of controlled heating, and may eliminate the need for a heated table and/or a heated printing environment. This may be achieved by generating and printing with a physically larger print bead and depositing layers at a substantially faster rate by using a larger extruder; for example, an extruder with a screw diameter ranging from about 40 mm to about 150 mm, or a screw diameter ranging from about 40 mm to about 100 mm, and a larger nozzle on the applicator head. This higher deposition speed and larger print bead may allow for the achievement of a fundamentally different approach to the process of additive manufacturing.

Provided the throughput (e.g., the amount of material processed by an extruder over a given period of time) of the applicator head is high enough, an entire layer of a large structure may be deposited at a fast enough rate that, even at room temperature, the deposited layer may not cool below the temperature at which proper layer-to-layer bonding occurs before the next layer is deposited. Even faster deposition rates may be possible by introducing one or more cooling mechanisms, e.g., one or more fans, blowers, coolant, or air conditioning, to accelerate the rate at which each layer cools. It may be ideal to balance deposition rate with cooling so that each deposited layer cools to the ideal temperature as a new layer begins to be deposited. It is noted that the ideal temperature may depend, at least in part, on the type of material being deposited. Accordingly, embodiments of the present disclosure may allow for a faster additive manufacturing and layer-deposition process and may eliminate or reduce the need for a heated table or a system to heat the print environment.

Because deposited layers may cool at a quicker rate, or at a more consistent rate than layers that are kept heated, the part being formed may be relatively more solid and structurally sound. Quicker hardening of deposited layers may give gravity less time to warp or otherwise affect the unsolidified layers so that gravity has a reduced effect, or no effect, on the continuously cooled part. While gravity may be less of a consideration when printing horizontal layers, because previous layers tend to support new ones, faster solidification of layers may be particularly advantageous when depositing layers onto a vertical surface. Keeping layers of the part being formed at elevated temperatures during printing may introduce problems, such as sagging, when trying to print vertically oriented layers.

As used herein, the terms "comprises," "comprising," or any other variation thereof, are intended to cover a non-exclusive inclusion, such as a process, method, article, or apparatus. The term "exemplary" is used in the sense of "example," rather than "ideal."

It should be noted that all numeric values disclosed herein may have a variation of +/−10% (unless a different variation is specified) from the disclosed numeric value. Further, all relative terms such as "about," "substantially," "approximately," etc. are used to indicate a possible variation of ±10% (unless noted otherwise or another variation is specified).

It may be understood that both the foregoing general description and the following detailed description are exemplary and explanatory only and are not restrictive of the disclosure, as claimed

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing, such as, e.g., via 3D printing. Specifically, the methods and apparatus described herein relate to developing a process of producing large structures at ambient temperature, e.g., room temperature, or cooler, which may change the focus of additive manufacturing from controlled heating to that of controlled cooling. Ambient air in embodiments of the disclosure may therefore range between, for example, 65-85° F., which may be cooler than ambient air in prior systems. Embodiments of the disclosure may reduce or eliminate the use of a heated table or a heated manufacturing environment.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
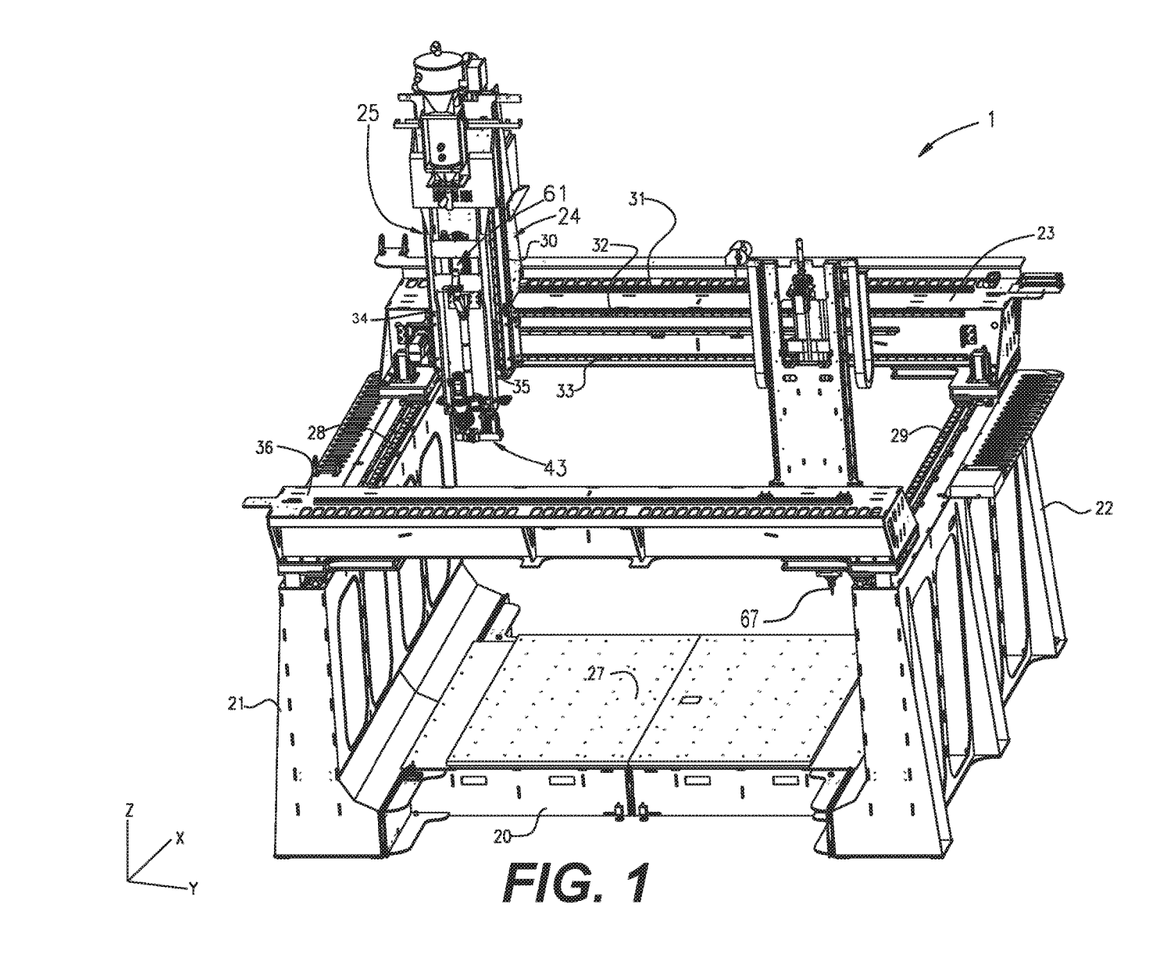
FIG. 1 is a perspective view of an exemplary CNC machine operable pursuant to an additive manufacturing process to form articles, according to an aspect of the present disclosure.

Referring to FIG. 1, there is illustrated a CNC machine 1 embodying aspects of the present disclosure. A controller (not shown) may be operatively connected to CNC machine 1 for displacing an application nozzle along a longitudinal line of travel, or x-axis, a transverse line of travel, or a y-axis, and a vertical line of travel, or z-axis, in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle carried by a print head or an applicator 43 of the system, and the flowable material may be deposited as a sequence of beads or layers on a substrate in an x-y plane. The extruded, flowable material may fuse to a previously deposited layer of material and may solidify upon a drop in temperature. The position of the print head relative to the substrate may then be incrementally advanced along a z-axis (perpendicular to the x-y plane), and the process may then be repeated to form a 3D part resembling the digital representation.

Machine 1 shown in FIG. 1 includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly 43 mounted on carrier 25. Located on bed 20 between side walls 21 and 22 is a worktable 27 provided with a support surface. The support surface may be disposed in an x-y plane and may be fixed or displaceable along an x-axis and/or a y-axis. For example, in a displaceable version, worktable 27 may be displaceable along a set of rails mounted on bed 20. Displacement of worktable 27 may be achieved using one or more servomotors and one or more of rails 28 and 29 mounted on bed 20 and operatively connected to worktable 27. Printing gantry 23 is disposed along a y-axis, supported on side walls 21 and 22. In FIG. 1, printing gantry 23 is mounted on a set of guide rails 28, 29, which are located along a top surface of side walls 21 and 22.

Printing gantry 23 may either be fixedly or displaceably mounted, and, in some aspects, printing gantry 23 may be disposed along an x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2A:
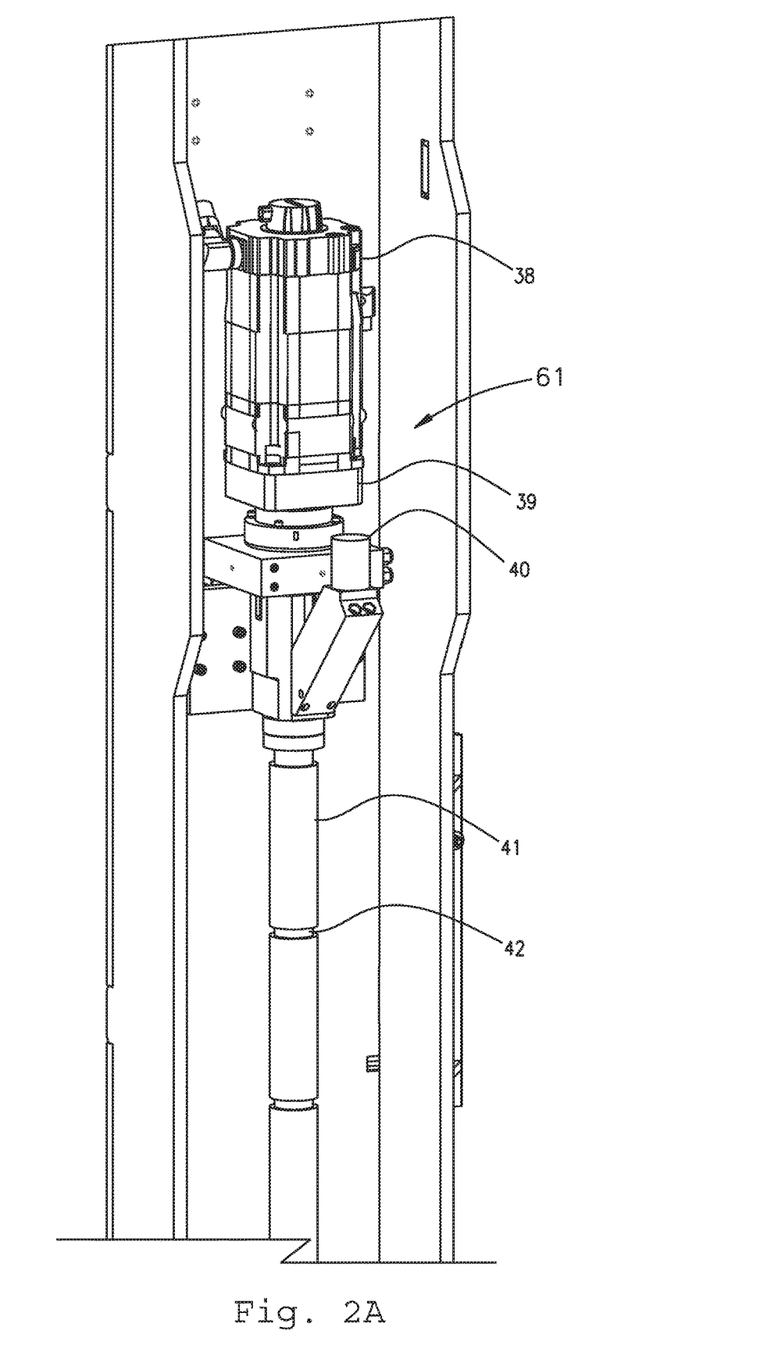
FIG. 2A is an enlarged perspective view of an exemplary carrier and extruder including a barrel of the exemplary CNC machine shown in FIG. 1.

As shown in FIG. 2A, mounted to carrier 25 is an extruder 61, which may be larger than extruders used for standard 3D printing. Extruder 61 may be capable of extruding a flowable material (e.g., thermoplastic material) at a rate of about 110 pounds per hour up to 500 pounds per hour, allowing for a significantly faster printing rate. Extruder 61 may comprise a servo motor 38, a gearbox 39, a feed housing 40, a barrel 42 (e.g., an extruder tube, an extruder output tube, or a pipe, etc.), and a screw 80 (FIG. 2B).

Figure 2B:
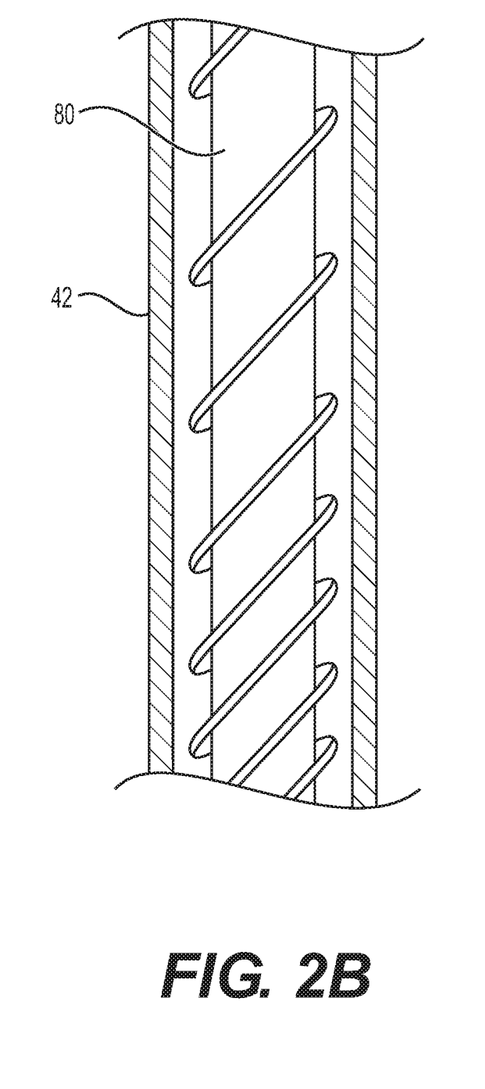
FIG. 2B is an enlarged, cutaway view of the exemplary barrel, as shown in FIG. 2A, including an exemplary screw.

As shown in FIG. 2B, screw 80 may be disposed within barrel 42 of extruder 61. In some aspects of the current disclosure, screw 80 may be disposed coaxially within barrel 42 along the longitudinal axis of barrel 42. Screw 80 may be actuated, or driven, by servomotor 38, which may be operatively connected to the screw 80 via gearbox 39. In some arrangements, screw 80 may have a variable pitch. In at least one example, screw 80 may have a variable pitch that decreases along a length of the screw 80, e.g., toward a downstream end of screw 80. One or more heaters 41 may surround at least a portion of barrel 42, as shown. In some embodiments, heaters 41 may wrap around a circumference of barrel 42. Heaters 41 may be disposed along a portion or along the entire length of barrel 42.

Pellets of material may be introduced into an opening in extruder 61 and proceed into barrel 42. In some examples, the pellets may be introduced into an opening in feed housing 40 of extruder 61. In additional or alternative examples, the pellets may be introduced into an opening in barrel 42 of extruder 61. Those of ordinary skill will recognize that the pellets may be of any suitable material, for example, thermoplastic material. The material may also be delivered to barrel 42 in any suitable size or configuration, in addition to, or instead of, pellets. In an exemplary embodiment, the pellets introduced into barrel 42 may be heated by friction generated from rotation of the screw 80 and/or by one or more heaters 41 disposed along the length of barrel 42. In an exemplary embodiment, once the pellets have melted, the molten material may be forced under pressure by the screw 80 further into barrel 42 and out of a bottom opening (not shown) of extruder 61. The molten material may be delivered to nozzle 51 for use in 3D printing activities, as described above.

Figure 3:
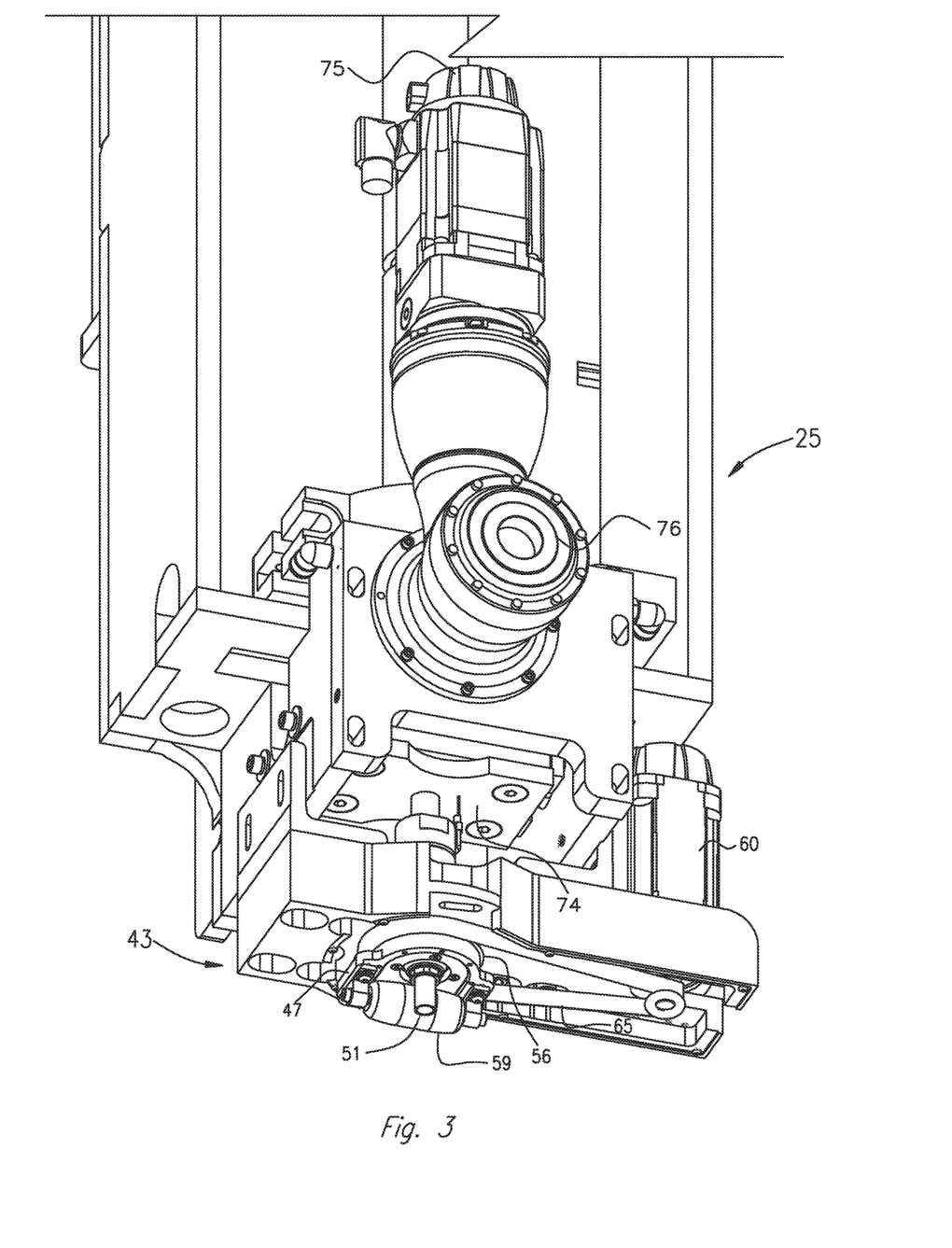
FIG. 3 is an enlarged perspective view of an exemplary carrier and applicator assembly of the exemplary CNC machine shown in FIG. 1.

As shown in FIG. 3, also mounted to carrier 25 (e.g., fixedly mounted to the bottom of carrier 25) is a positive displacement gear pump 74, which may be driven by a servomotor 75, through a gearbox 76. Gear pump 74 receives molten plastic from extruder 61, shown in FIG. 2A. A bead shaping roller 59, for compressing material, may be mounted on a carrier bracket 47. Roller 59 may be movably mounted on carrier bracket 47, for example, rotatably or pivotably mounted. Roller 59 may be mounted so that a center portion of roller 59 is aligned with nozzle 51. In some examples, roller 59 may be oriented tangentially to nozzle 51. In some examples, nozzle 51 may be sized larger than nozzles used in standard 3D printing. Roller 59 may be mounted relative to nozzle 51 so that material, e.g., one or more oversized beads of flowable material, discharged from nozzle 51 is smoothed, flattened, leveled, and/or compressed by roller 59. While average beads of thermoplastic resin may have a diameter of about 0.5 inches (e.g., 12.7 mm), such oversized or larger-than-average beads of thermoplastic resin may have a diameter of about 1.0 inches (e.g., 25.4 mm). In some arrangements of the disclosure, the oversized or larger-than-average beads of thermoplastic resin may have a diameter ranging from about 0.5 inches (e.g., 12.7 mm) to about 1.0 inches (e.g., 25.4 mm). In a further arrangement, the bead of thermoplastic resin may have a diameter greater than 1.0 inches. One or more servomotors 60 may be configured to move, e.g., rotationally displace, carrier bracket 47 via a pulley or sprocket 56 and drive-chain or belt 65 arrangement, or by any other suitable means.

Figure 4:
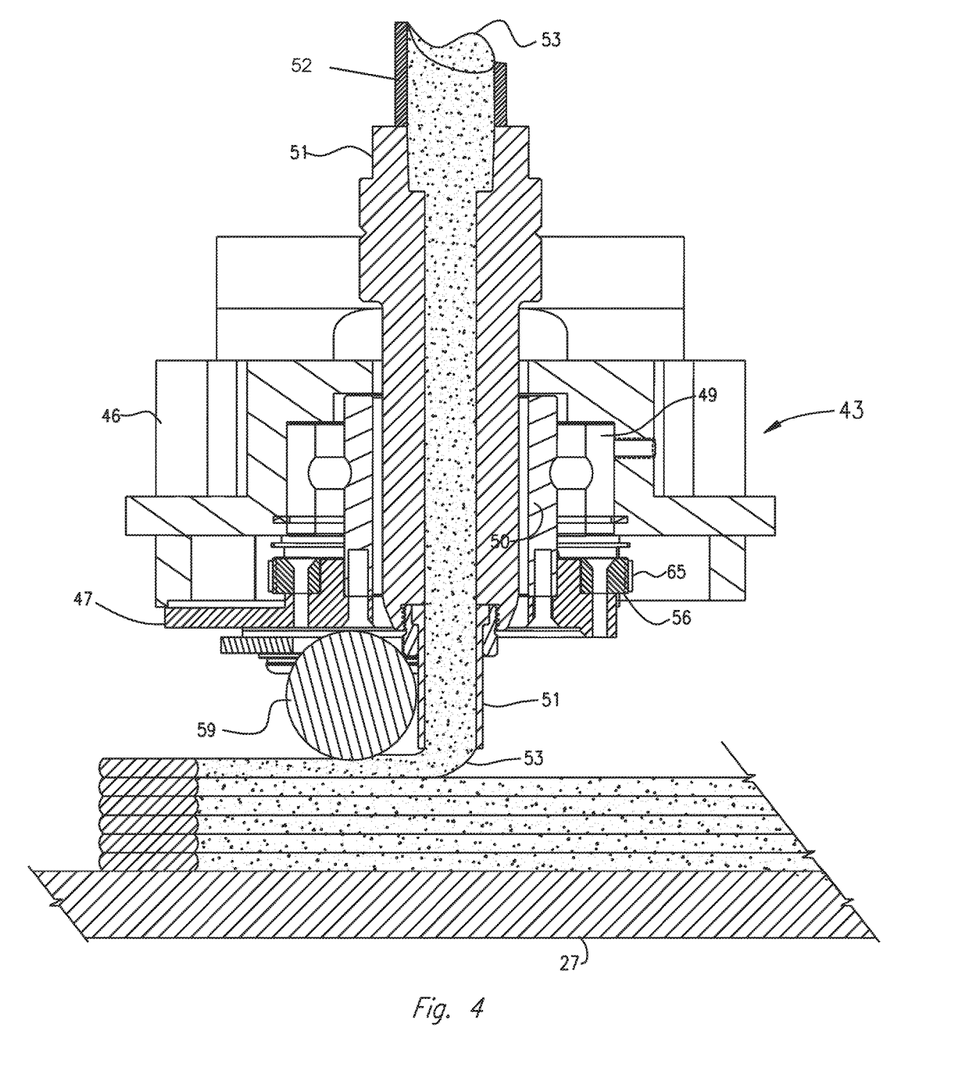
FIG. 4 is an enlarged cross-sectional view of an exemplary applicator head assembly, including an exemplary roller, shown in FIG. 3 during use.

Continuing with reference to FIG. 4, applicator head 43 may include a housing 46 with a roller bearing 49 mounted therein. Carrier bracket 47 may be fixedly mounted to an adaptor sleeve 50, journaled in bearing 49. As best shown in FIG. 4, a conduit 52 may be used to convey an oversized molten bead of a flowable material (e.g., thermoplastic material) under pressure from a suitable source (e.g., extruder 61 and an associated gear pump) disposed on carrier 25 to applicator head 43. Applicator head 43 may be fixedly (or removably) connected to, and in communication with, a larger-than-normal nozzle 51; for example, a nozzle 51 with a diameter ranging from 0.3 inches (e.g., 7.62 mm) to 0.7 inches (e.g., 17.78 mm). For example, in some arrangements, nozzle 51 may have a diameter of about 0.3 inches (e.g., 7.62 mm), about 0.4 inches (e.g., 10.6 mm), about 0.5 inches (e.g., 12.7 mm), about 0.6 inches (e.g., 15.24 mm), or about 0.7 inches (e.g., 17.78 mm). In use, flowable material 53 (e.g., melted thermoplastic) may be heated sufficiently to form a large or oversized molten bead thereof, which is then extruded through conduit 52 and delivered through nozzle 51, to form rows of deposited material 53 on a surface of worktable 27.

Such beads of molten material may be flattened, leveled, and/or fused to adjoining layers by any suitable means, such as, e.g., roller 59. As described above, successive layers may be deposited and fused to one another to form an article. In an exemplary embodiment, during operation of machine 1, each successive deposited (e.g., 3D printed) layer may not cool below the temperature at which proper layer-to-layer bonding occurs before the next layer is deposited on the previous layer. In some embodiments, faster print rates may be possible by introducing one or more cooling mechanisms (e.g., fan) so that each printed layer is cooled to the ideal bonding temperature just as a new layer begins to print. The proper bonding temperature may depend, e.g., on the type of polymer being printed. For example, when printing an ABS polymer, the temperature of the material may need to be at least approximately 100° C. for proper bonding to occur. However, with other polymers, proper bonding may require that the deposited material be hundreds of degrees higher.

The larger bead of flowable material used in embodiments of the present disclosure may contain more British Thermal Units ("BTUs") of heat than a standard small bead. The amount of heat energy within a print bead is generally dependent on the cross-sectional size of the bead. For example, if the bead is twice as large, it will generally contain twice as much heat energy, and if it is four times as large, it will generally contain four times as much heat energy. Also, a smaller, thinner bead has more surface area relative to its volume than a thicker bead, so the smaller, thinner bead will generally cool faster than the thicker bead. The exact BTU value of a given bead may vary based on, e.g., the type of polymer being used and the dimensions/geometry of the polymer bead.

Owing to the greater BTUs of heat in the large bead of material, more internal heat may be transferred from the freshly printed large bead of material to the previous printed layer. This heat transfer to the previous layer may allow the previously printed layer to cool more than normal before the subsequent layer is printed. Even though the previous layer is cooler, because of the greater BTUs of heat contained in the larger print bead of the subsequent layer, the subsequent layer may sufficiently reheat the previously deposited layer of flowable matter to create an acceptable layer-to-layer bond between the layers. Because the previous layer of deposited flowable material may be cooler, it may be in a relatively solid state prior to accepting the next layer of deposited material. Therefore, the overall part may be at a lower temperature than if the part had to be printed at an elevated temperature in a heated environment. When an entire part printed in a heated environment is finally cooled, internal stresses may tend to develop within the part, which may open undesirable voids in the interior of the part. This tendency may be reduced or avoided if the part is cooled, layer by layer, to a relatively solid state during the printing process, as described above.

Figure 5A:
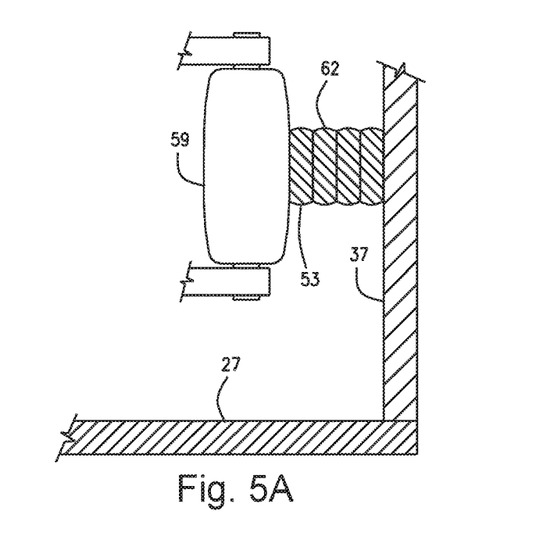
FIG. 5A is a cross-sectional front view of a roller while vertical printing rows of deposited material.
Figure 5B:
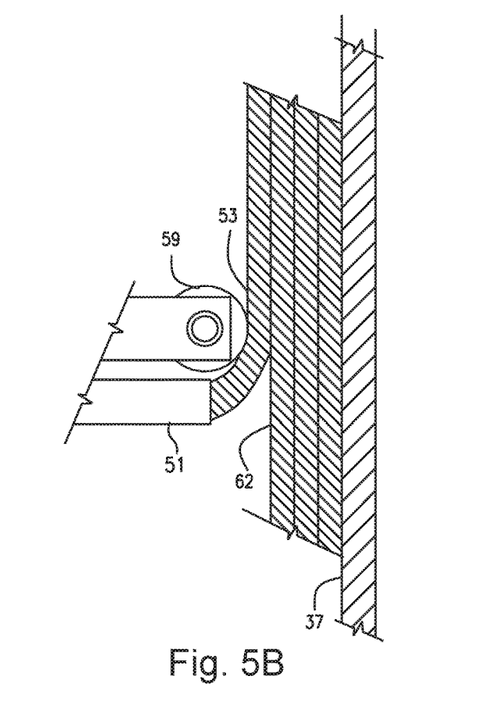
FIG. 5B is a top view of FIG. 5A with a print nozzle also in view.

This cooling layer-by-layer to a relatively solid state during the printing process also facilitates the ability to perform vertical printing, as shown in the front view of FIG. 5A and the top view in FIG. 5B. A previous layer 62 may cool (e.g., either passively or actively (with use of a fan or other cooling element)) to a relatively solid state before a subsequent layer 53 is deposited. Subsequent layer 53 being printed may have enough internal heat to reheat previous layer 62 for proper bonding of subsequent layer 53 to previous layer 62. While gravity may only be a minor consideration for horizontal printing on a horizontal worktable 27, gravity may be a larger factor when vertical printing on a vertical worktable 37, which is why maintaining the part being printed at an elevated temperature in a heated environment may be an issue when vertical printing. If the previous layers are not at a relatively solid state, unwanted problems, such as sagging or warping of the part, may tend to occur as the part is formed on vertical worktable 37.

From the foregoing detailed description, it will be evident that there are a number of changes, adaptations, and modifications of the present invention that come within the province of those persons having ordinary skill in the art to which the aforementioned invention pertains. However, it is intended that all such variations not departing from the spirit of the invention be considered as within the scope thereof as limited by the appended claims.

What is claimed is:

1. An additive manufacturing system, comprising:
an extruder having an opening dimensioned to receive a material, a barrel, and a screw within the barrel, wherein the screw has a diameter ranging between about 20 mm and about 150 mm, and wherein the barrel extends along a longitudinal axis;
one or more heaters positioned along at least a portion of the barrel, wherein, as the material passes through the barrel, the one or more heaters at least partially melt the material;
a gear pump in fluid communication with the barrel for receiving the at least partially melted material;
a nozzle in fluid communication with the gear pump for depositing the at least partially melted material; and
a vertical worktable including a planar side surface configured to support a base layer of the at least partially melted material deposited thereon, the at least partially melted material being deposited in a cooled environment that includes at least one cooling mechanism that cools layers of the at least partially melted material supported on the base layer to an at least partially solid state in a layer by layer manner, wherein the cooled environment does not include a system to heat the print environment, and wherein the at least one cooling mechanism includes a fan a blower coolant or an air conditioner.

2. The system of claim 1, wherein the nozzle has a diameter ranging between about 0.2 inches to about 1.0 inches.

3. The system of claim 1, wherein the extruder has a throughput rate ranging from about 110 pounds of material per hour to about 500 pounds of material per hour.

4. The system of claim 1, further comprising a horizontal worktable.

5. The system of claim 1, wherein the screw has a variable pitch.

6. The system of claim 5, wherein rotation of the screw within the barrel is configured to generate heat sufficient to at least partially melt the material when the material is within the barrel.

7. The system of claim 1, wherein the one or more heaters includes a plurality of heaters disposed along a length of the barrel.

8. The system of claim 1, wherein the additive manufacturing system includes a programmable computer numeric control machine.

9. The system of claim 1, further comprising a horizontal worktable, wherein the vertical worktable is disposed on and orthogonal to the horizontal worktable, and wherein the nozzle has a diameter ranging between about 0.2 inches to about 1.0 inches and the extruder has a throughput rate ranging from about 110 pounds of material per hour to about 500 pounds of material per hour, wherein the additive manufacturing system is operable to construct a part in the print environment when the print environment has a temperature of 65-85 degrees Fahrenheit.

10. The system of claim 1, wherein the at least one cooling mechanism is a fan to cool the material deposited on the vertical worktable.

11. The system of claim 1, wherein the at least one cooling mechanism is configured to cool a first layer to the at least partially solid state before a second layer is deposited on the first layer.

12. An additive manufacturing system, comprising:
a carrier;
an extruder having an opening dimensioned to receive a material, a barrel, and a screw positioned within the barrel, wherein the barrel extends along a longitudinal axis, wherein the extruder is coupled to the carrier;
one or more heaters positioned along at least a portion of the barrel, wherein, as the material passes through the barrel, the one or more heaters at least partially melt the material;
a gear pump in fluid communication with the barrel for receiving the at least partially melted material;
a nozzle in fluid communication with the gear pump for depositing the at least partially melted material, wherein the nozzle has a diameter ranging between about 0.2 inches to about 1.0 inches;
a cooling mechanism including at least one of a fan, a blower, coolant, or an air conditioner configured to cool layers of the at least partially melted material supported on a base layer of the at least partially melted material to an at least partially solid state in a layer by layer manner; and
a vertical worktable including a planar side surface configured to support the base layer deposited thereon, the at least partially melted material being deposited in an environment having a temperature of 65-85 degrees Fahrenheit.

13. The system of claim 12, wherein the screw has a diameter ranging between about 20 mm and about 150 mm.

14. The system of claim 12, wherein the extruder has a throughput rate ranging from about 110 pounds of material per hour to about 500 pounds of material per hour.

15. The system of claim 12, wherein the one or more heaters includes a plurality of heaters disposed along a length of the barrel.

16. The system of claim 12, wherein the additive manufacturing system includes a programmable computer numeric control machine.

17. The system of claim 12, further comprising a horizontal worktable orthogonal to the vertical worktable.

18. An additive manufacturing system, comprising:
an extruder having an opening dimensioned to receive a material, a barrel extending along a longitudinal axis, and a screw, wherein the extruder has a throughput rate ranging from about 110 pounds of material per hour to about 500 pounds of material per hour, wherein the extruder is movable along a plurality of axes;
one or more heaters positioned along at least a portion of the barrel, wherein, as the material passes through the barrel, the one or more heaters at least partially melt the material;
a gear pump in fluid communication with the barrel for receiving the at least partially melted material;
a nozzle in fluid communication with the gear pump for depositing the at least partially melted material;
at least one cooling mechanism including a fan, a blower, coolant, or an air conditioner configured to cool layers of the at least partially melted material supported on a base layer of the at least partially melted material to an at least partially solid state in a layer by layer manner; and
a vertical worktable including a planar side surface configured to support the base layer deposited thereon, the at least partially melted material being deposited in an environment having a temperature of 65-85 degrees Fahrenheit.

19. The system of claim 18, wherein the screw has a diameter ranging between about 20 mm and about 150 mm.

20. The system of claim 18, wherein the nozzle has a diameter ranging between about 0.2 inches to about 1.0 inches.

21. The system of claim 18, wherein the additive manufacturing system includes a programmable computer numeric control machine.

22. The system of claim 18, wherein the extruder is coupled to a carrier of a computer numeric control machine.

\* \* \* \* \*